US011076697B1

(12) United States Patent
Line et al.

(10) Patent No.: US 11,076,697 B1
(45) Date of Patent: Aug. 3, 2021

(54) SEATING ASSEMBLY FOR A VEHICLE (71) Applicant: Ford Global Technologies, LLC, Dearborn, MI (US)

(72) Inventors: Johnathan Andrew Line, Northville, MI (US); Ratan Howlader, Dearborn, MI (US); Robert Charles Shipley, Plymouth, MI (US); David Frederick Lyons, New Haven, MI (US); Sean Bayle West, Monroe, MI (US); Spencer Robert Hoernke, Dundas (CA); Macit Aktas, Windsor (CA); Thomas J. Susko, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/027,788

(22) Filed: Sep. 22, 2020

(51) Int. Cl.
*A47C 7/46* (2006.01)
*B60N 2/30* (2006.01)
*B60N 2/90* (2018.01)

(52) U.S. Cl.
CPC ............ *A47C 7/465* (2013.01); *B60N 2/3011* (2013.01); *B60N 2/3038* (2013.01); *B60N 2/99* (2018.02)

(58) Field of Classification Search
CPC ........... A47C 7/465; A47C 7/46; A47C 7/462; A47C 7/345; B60N 2/99; B60N 2/3011; B60N 2/3002; B60N 2/3004; B60N 2/3009; B60N 2/3038
USPC .......................................... 297/284.2, 284.4
See application file for complete search history.

(56) References Cited

U.S. PATENT DOCUMENTS

| 5,570,931 | A | 11/1996 | Kargilis et al. | |
| 5,609,394 | A * | 3/1997 | Ligon, Sr. ............ | B60N 2/6671 297/284.1 |
| 5,704,687 | A * | 1/1998 | Klingler ............... | B60N 2/6673 297/284.4 |
| 6,340,206 | B1 * | 1/2002 | Andersson ............... | B60N 2/23 297/216.14 |
| 7,264,310 | B2 | 9/2007 | Holdampf et al. | |
| 7,322,652 | B1 | 1/2008 | Tache | |
| 7,794,013 | B2 * | 9/2010 | Abe ..................... | B60N 2/5816 297/216.12 |
| 8,126,615 | B2 | 2/2012 | McMillen et al. | |
| 2006/0006709 | A1* | 1/2006 | Uno ....................... | B60N 2/888 297/216.12 |
| 2006/0273644 | A1 | 12/2006 | Sturt et al. | |
| 2011/0121624 | A1* | 5/2011 | Brncick ............... | B60N 2/6673 297/284.2 |

(Continued)

FOREIGN PATENT DOCUMENTS

KR 20030020685 A 3/2003
WO 2008031218 A1 3/2008

*Primary Examiner* — Mark R Wendell
(74) *Attorney, Agent, or Firm* — David Coppiellie; Price Heneveld LLP (57) ABSTRACT

A seating assembly includes a frame that has an upper portion that defines an attachment aperture and a lower portion. A bracket is coupled to the lower portion. A cable has a first end and a second end that is coupled to the bracket. The cable is operable between a support position and a compressed position. A guide-sleeve is operably coupled with the cable and is disposed within the attachment aperture of the upper portion of the frame. The guide-sleeve includes retention tabs that are operably coupled to the upper portion.

20 Claims, 12 Drawing Sheets

(56) References Cited

U.S. PATENT DOCUMENTS

| | | | | |
|---|---|---|---|---|
| 2012/0032486 A1* | 2/2012 | Baker | ................ | B60N 2/72 |
| | | | | 297/354.1 |
| 2014/0077548 A1* | 3/2014 | Peterson | ................ | A47C 3/00 |
| | | | | 297/284.4 |

* cited by examiner

SEATING ASSEMBLY FOR A VEHICLE

FIELD OF THE DISCLOSURE

The present disclosure generally relates to a seating assembly for a vehicle. More specifically, the present disclosure relates to a guide-sleeve for a seating assembly.

BACKGROUND OF THE DISCLOSURE

Vehicles often have seats with side bolsters. The seats are typically capable of folding forward so a seatback of the seat comes into contact with a seat base of the seat. The bolsters of the seatback typically come into contact with the bolsters of the seat base when the seat is folded forward.

SUMMARY OF THE DISCLOSURE

According to at least one aspect of the present disclosure, a seating assembly for a vehicle includes a seat frame including a seatback and a seat base. The seat frame has an upper portion that defines an attachment aperture and a lower portion. A pliable body is disposed over and is coupled to the seatback. The pliable body defines a channel along a length of the pliable body. A bracket is coupled to the lower portion of the seatback. A guide-sleeve is coupled to the upper portion of the seat frame. The guide-sleeve has retention tabs, a body that defines a cavity, and flanges that extend outwardly from the body. A cable has a first end that is selectively disposed within the cavity of the guide-sleeve and a second end is coupled to the bracket.

According to another aspect of the present disclosure, a vehicle seating assembly includes a frame that has an upper portion and a lower portion. A pliable body is disposed over the frame and defines a channel along a length of the pliable body. A cable is disposed within the channel of the pliable body and is selectively operable between a first position and a second position. A guide-sleeve is coupled to the frame and includes a hollow body that defines a cavity. The guide-sleeve also includes retention tabs that extend from the hollow body and are configured to couple the guide-sleeve to the frame. The cable is operably disposed within the cavity of the hollow body.

According to another aspect of the present disclosure, a seating assembly includes a frame that has an upper portion that defines an attachment aperture and a lower portion. A bracket is coupled to the lower portion. A cable has a first end and a second end that is coupled to the bracket. The cable is operable between a support position and a compressed position. A guide-sleeve is operably coupled with the cable and is disposed within the attachment aperture of the upper portion of the frame. The guide-sleeve includes retention tabs that are operably coupled to the upper portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
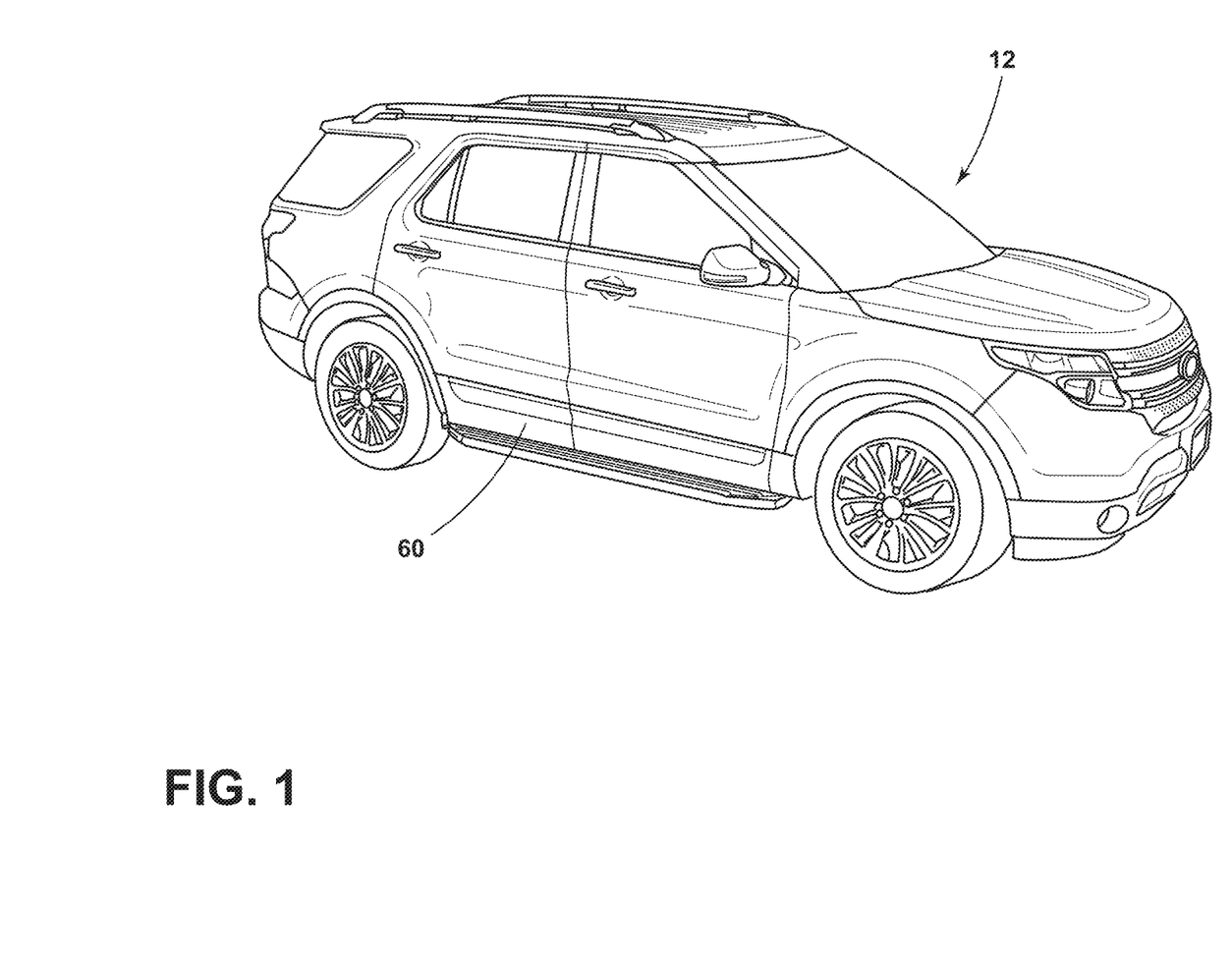
FIG. 1 is a side perspective view of a vehicle of the present disclosure.
Figure 2:
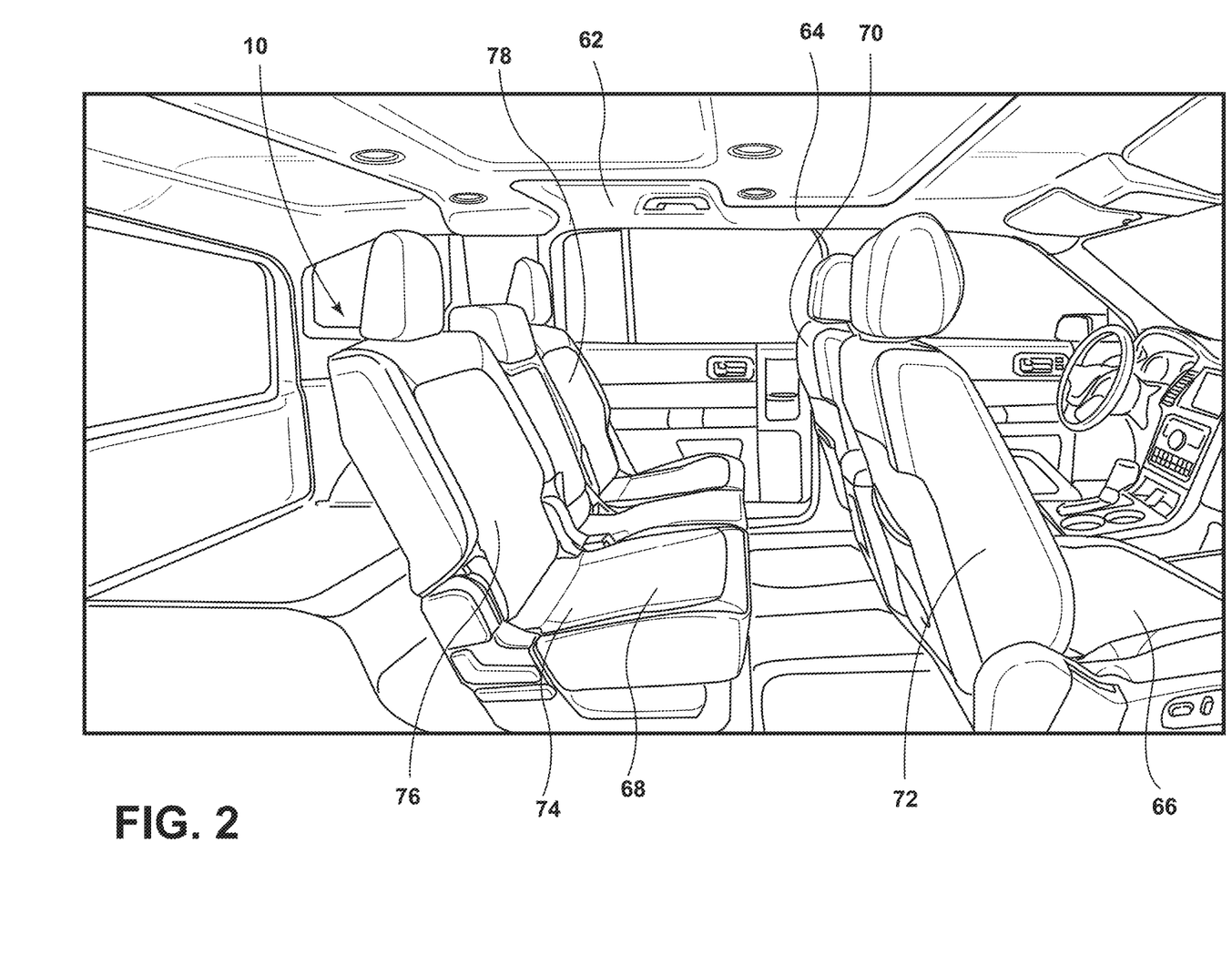
FIG. 2 is a side perspective view of a passenger compartment of a vehicle of the present disclosure.
Figure 3:
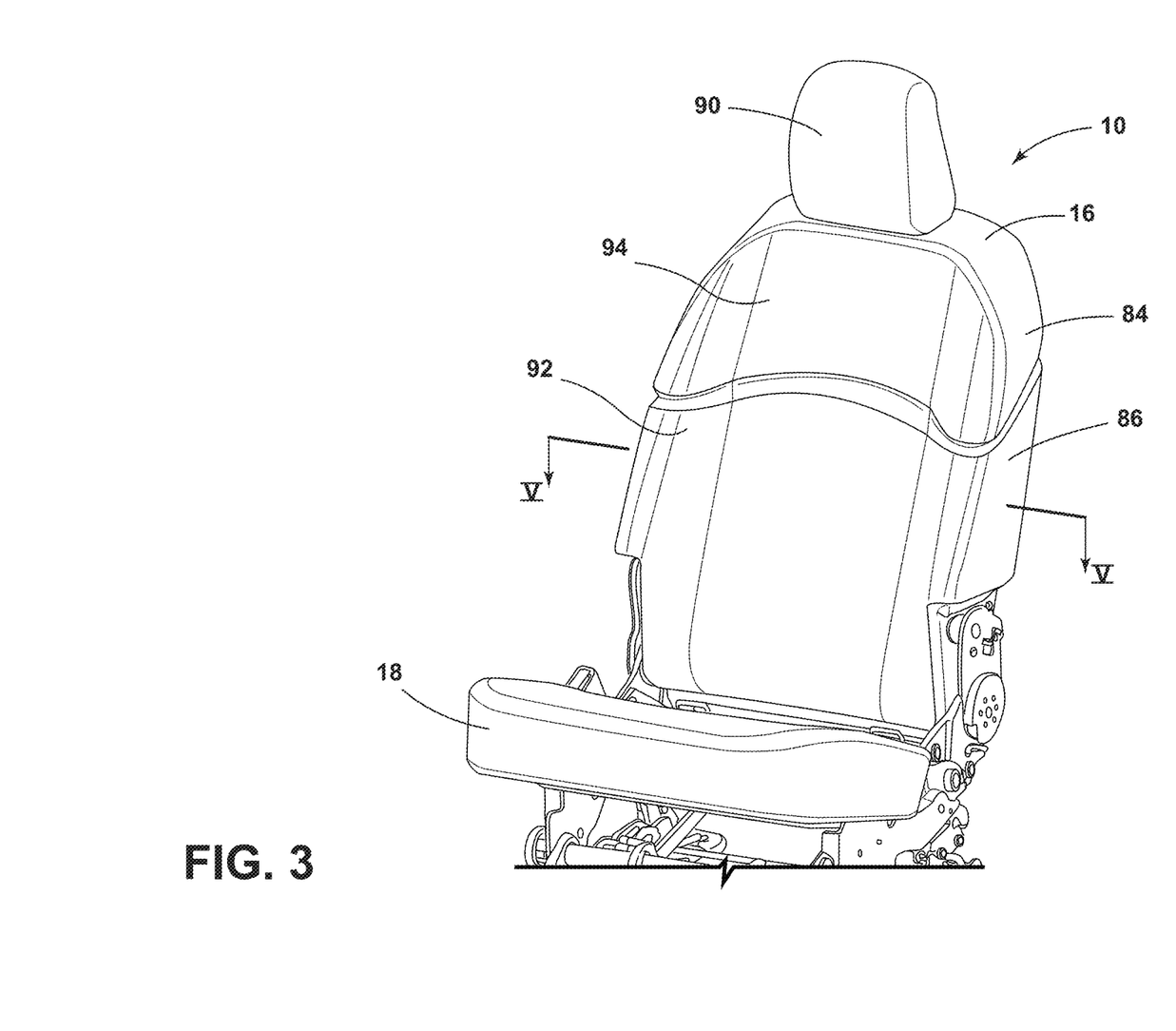
FIG. 3 is a front perspective view of a seating assembly of the present disclosure.
Figure 4:
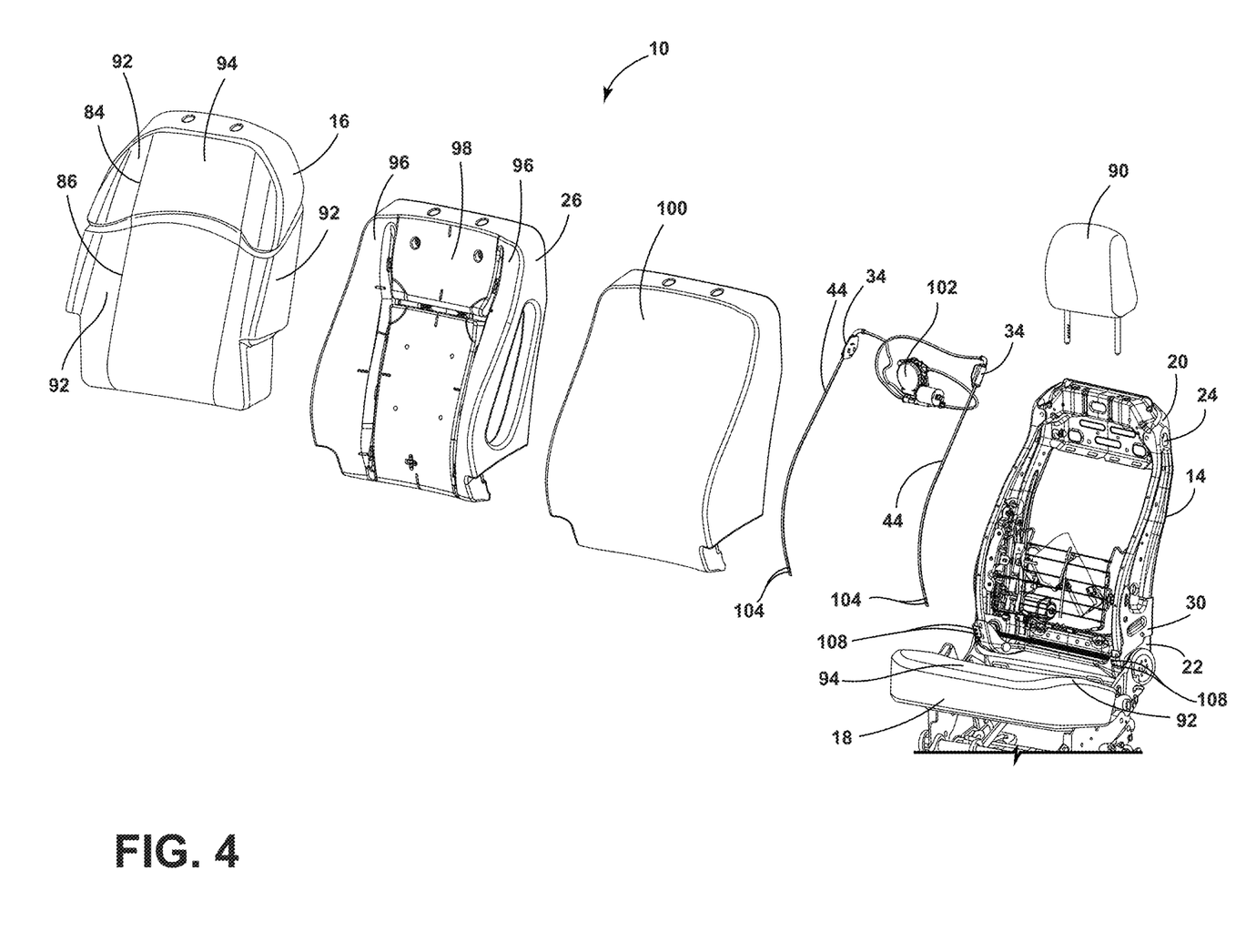
FIG. 4 is an exploded front perspective view of the seating assembly of FIG. 3.
Figure 5:
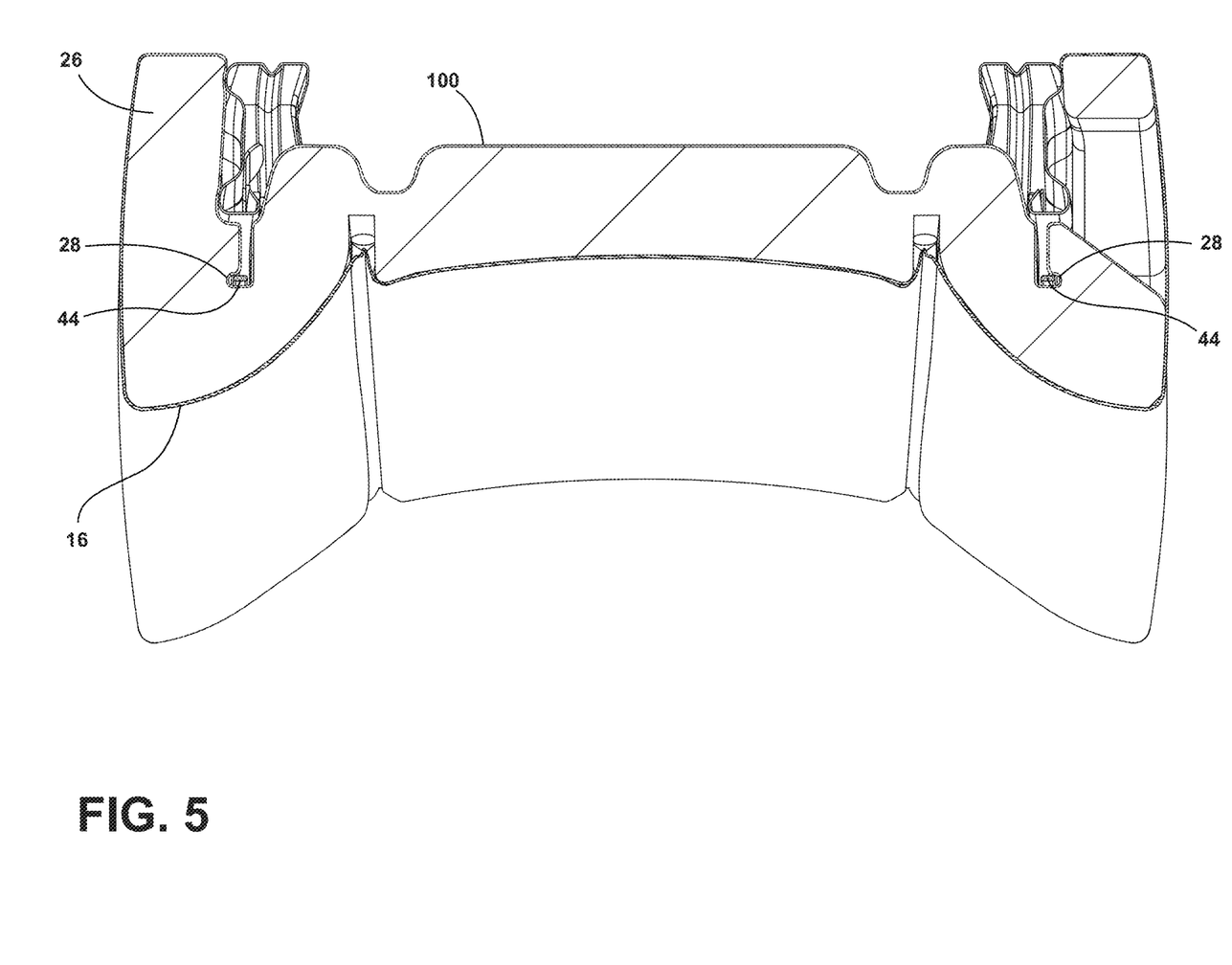
FIG. 5 is a cross-sectional view of a seatback of the seating assembly of FIG. 3 taken along lines V-V.
Figure 6:
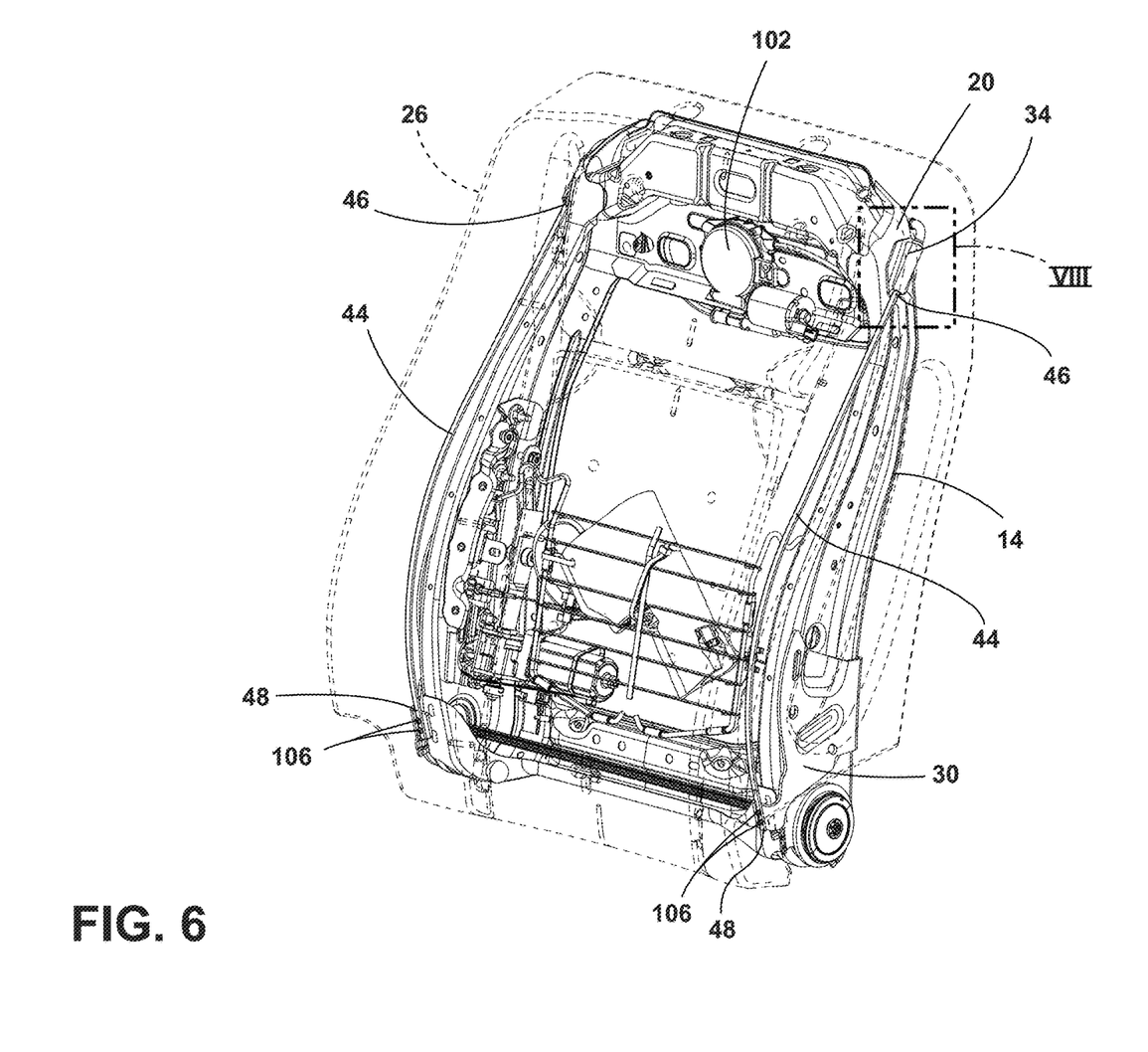
FIG. 6 is a front perspective view of a seatback for a seating assembly of the present disclosure with a pliable body in phantom.
Figure 7:
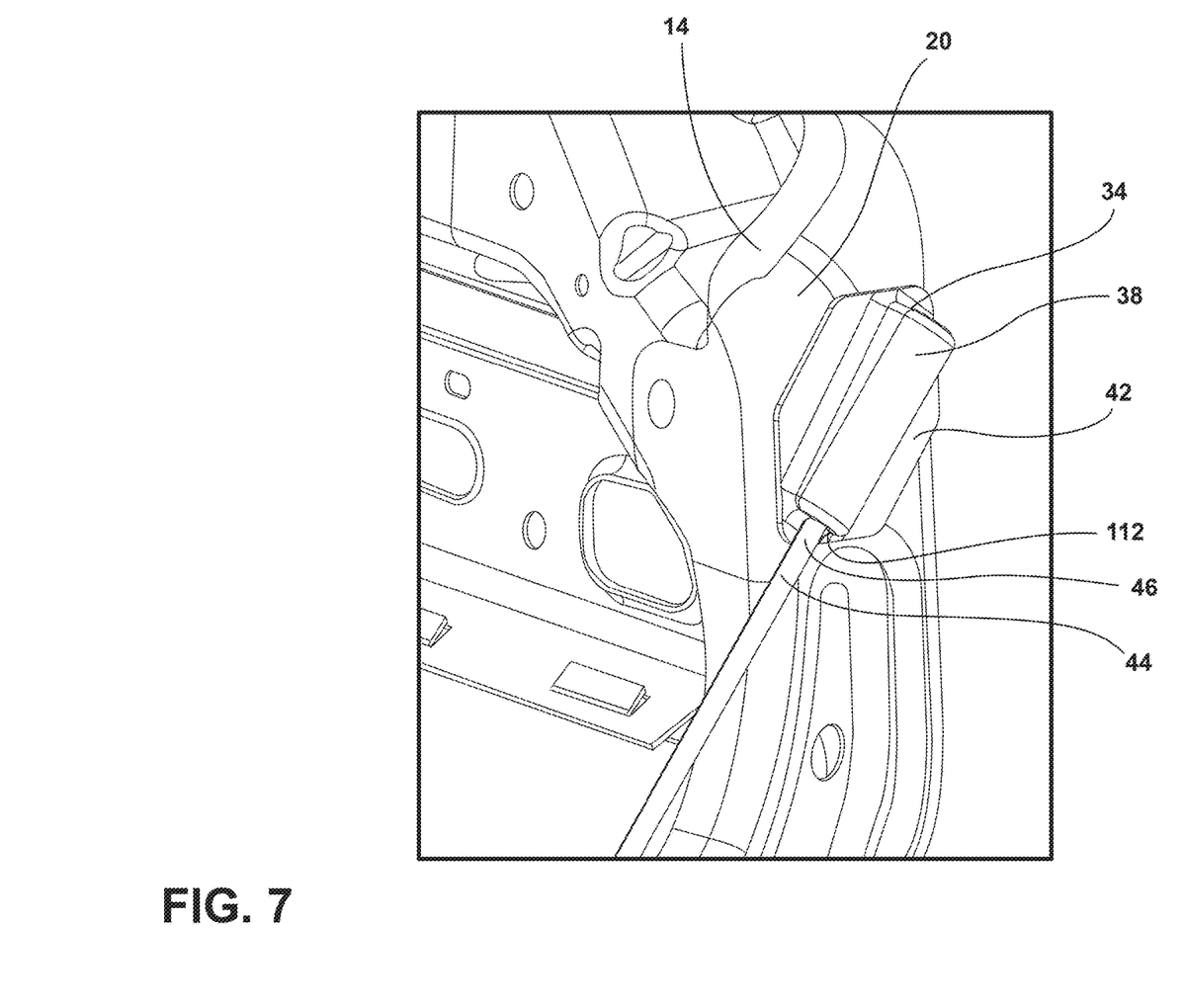
FIG. 7 is an enlarged side perspective view of a guide-sleeve of the present disclosure taken at area VII of FIG. 6.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-13, reference number 10 generally refers to a seating assembly for a vehicle 12 that includes a seat frame 14 including a seatback 16 and a seat base 18. The seat frame 14 has an upper portion 20 and a lower portion 22. The seat frame 14 defines an attachment aperture 24 proximate to the upper portion 20. A pliable body 26 is disposed over and coupled to the seatback 16. The pliable body 26 defines a channel 28 along a length L of the pliable body 26. A bracket 30 is coupled to the lower portion 22 of the seat frame 14. A guide-sleeve 34 is coupled to the upper portion 20 of the seat frame 14. The guide-sleeve 34 has retention tabs 36, a body 38 defining a cavity 40, and flanges 42 extending outwardly from the body 38. A cable 44 has a first end 46 that is selectively disposed within the cavity 40 of the guide-sleeve 34 and a second end 48 coupled to the bracket 30.

Referring to FIGS. 1-4, the vehicle 12 includes a vehicle body 60, which defines an interior 62 of the vehicle 12 having a passenger compartment 64 therein. The passenger compartment 64 may include a first seating row 66 and a second seating row 68. Fewer or more seating rows may be included in the vehicle 12 without departing from the teachings herein. The first seating row 66 may include a driver seat 70 and a passenger seat 72, and the second seating row 68 may include rear passenger seats 74. The rear passenger seats 74 of the second seating row 68 may include bucket seating or may be bench seating. As illustrated, the rear passenger seats 74 include a first rear passenger seat 76 and a second rear passenger seat 78.

In various examples, the vehicle 12 is a wheeled motor vehicle 12, which may be a sedan, a sport utility vehicle, a truck, a van, a crossover, and/or other styles of vehicle. The vehicle 12 may be a manually operated vehicle (e.g., with a human driver), a fully autonomous vehicle (e.g., no human driver), or a partially autonomous vehicle (e.g., may be operated with or without a human driver). Additionally, the vehicle 12 may be utilized for personal and/or commercial purposes, such as ride-providing services (e.g., chauffeuring) and/or ride-sharing services.

Referring now to FIGS. 3-6, the seating assembly 10 includes the seatback 16 and the seat base 18, which are generally supported by and coupled to the seat frame 14. The seatback 16 has an upper support portion 84 and a lower support portion 86. It is generally contemplated that the upper support portion 84 and the lower support portion 86 may generally correspond to the upper portion 20 and the lower portion 22, respectively, of the seat frame 14. As mentioned above, the attachment aperture 24 is defined by the upper portion 20 of the seat frame 14, such that the area of the upper portion 20 surrounding the attachment aperture 24 may be referred to as engagement edges 88 (FIG. 10), described in further detail below with respect to the guide-sleeve 34.

A headrest 90 may be coupled to the seatback 16 proximate to the upper support portion 84, and the seatback 16 defines bolsters 92 that are integrally formed with the seatback 16 and outwardly extend from a central portion 94 of the seatback 16. The bolsters 92 may extend a greater distance from the central portion 94 proximate to the lower support portion 86 as compared to the upper support portion 84. The seat base 18 may also include the bolsters 92, which outwardly extend from the central portion 94 of the seat base 18. The bolsters 92 may be at least partially formed from the pliable body 26, such that lateral portions 96 of the pliable body 26 are generally raised relative to a center 98 of the pliable body 26. It is generally contemplated that the pliable body 26 may be formed from a foam pad having a general foam density of approximately 8 kPa. It is also contemplated that the pliable body 26 may have a foam density of approximately less than 8 kPa and/or approximately greater than 8 kPa.

With further reference to FIGS. 3-6, the bolsters 92 may also be formed from the cable 44 in addition to the lateral portions 96 of the pliable body 26. As mentioned above, each of the lateral portions 96 of the pliable body 26 defines the channel 28, such that the cable 44 extends along the lateral portion 96 within the channel 28. It is generally contemplated that the pliable body 26 may be formed from the foam material mentioned above, such that the pliable body 26 may be compressible to provide overall comfort for an occupant. The pliable body 26 may also include generally rigid features so as to provide structural support for an occupant, such that the pliable body 26 may provide both comfort and support for an occupant. Specifically, the bolsters 92 provide side support for the occupant as the bolsters 92 extend along the seatback 16 and may also be defined along the seat base 18.

A fabric layer 100 may be positioned between the pliable body 26 and the cable 44 to minimize contact between the cable 44 and the pliable body 26. The fabric layer 100 may be formed from a material that is generally structurally resilient and resistant to frictional wear. In addition, the fabric layer 100 may generally be approximately 3 millimeters in thickness. It is contemplated that the fabric layer 100 may be approximately less than 3 millimeters and/or approximately greater than 3 millimeters.

As mentioned, the fabric layer 100 may provide a barrier between the cable 44 and the pliable body 26, which may generally extend the overall life of the pliable body 26.

Stated differently, the fabric layer 100 may minimize potential wear on the pliable body 26, in particular the channel 28 defined by the pliable body 26, that may occur as a result of the engagement between the pliable body 26 and the cable 44. The fabric layer 100 is typically a material that may be formed, such that once formed the fabric layer 100 may retain its shape. The formation of the fabric layer 100 may at least partially retain the channel 28 as the pliable body 26 is compressed, described in further detail below. Maintaining the shape of the channel 28 minimizes potential shifting of the cable 44 as the pliable body 26 and the cable 44 are compressed.

Referring still to FIGS. 3-6, the cable 44 follows a general curvature of the bolster 92. Stated differently, the cable 44 and the bolster 92 extend a greater distance past a central portion 94 of the seatback 16 toward the lower portion 22 of the seat frame 14 as compared to the extension proximate to the upper portion 20. It is generally contemplated that the cable 44 may be formed from an elastically deformable metal that may be compressed and extended while maintaining structural stability. As mentioned above, the first end 46 of the cable 44 is disposed within the guide-sleeve 34, and the second end 48 of the cable 44 is coupled to the seat frame 14 via the bracket 30. The first end 46 of the cable 44 may also be coupled to a power actuator 102, which is described in further detail below. The second end 48 of the cable 44 defines coupling apertures 104 through which fasteners 106 may extend to couple the second end 48 to the bracket 30, which has corresponding fastening apertures 108.

Figure 8:
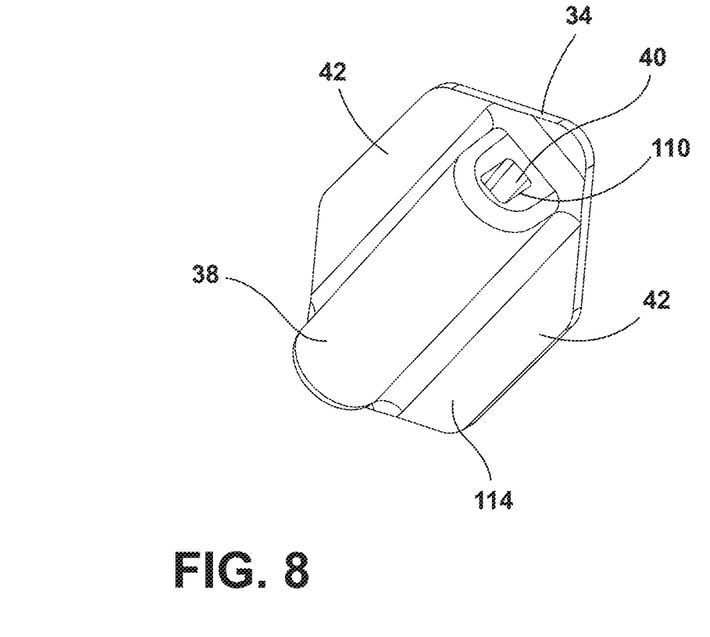
FIG. 8 is a front perspective view of a guide-sleeve of the present disclosure.
Figure 9:
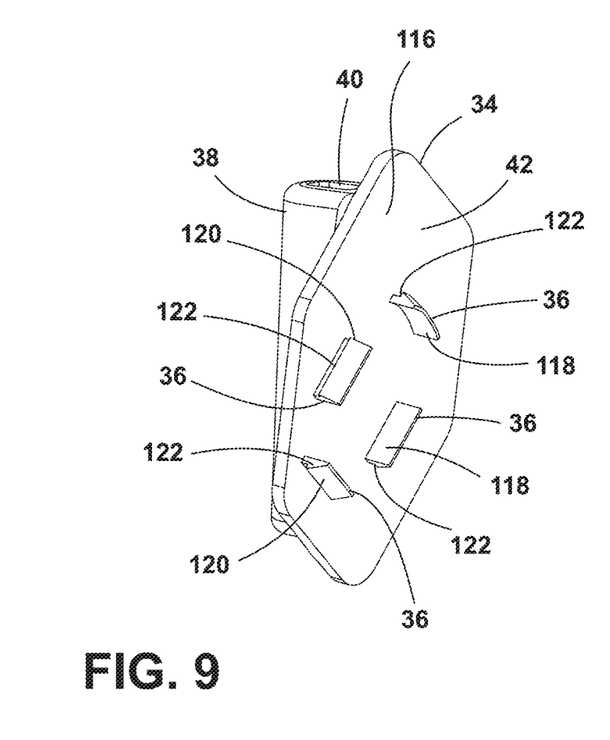
FIG. 9 is a rear perspective view of the guide-sleeve of FIG. 8 that includes retention tabs.
Figure 10:
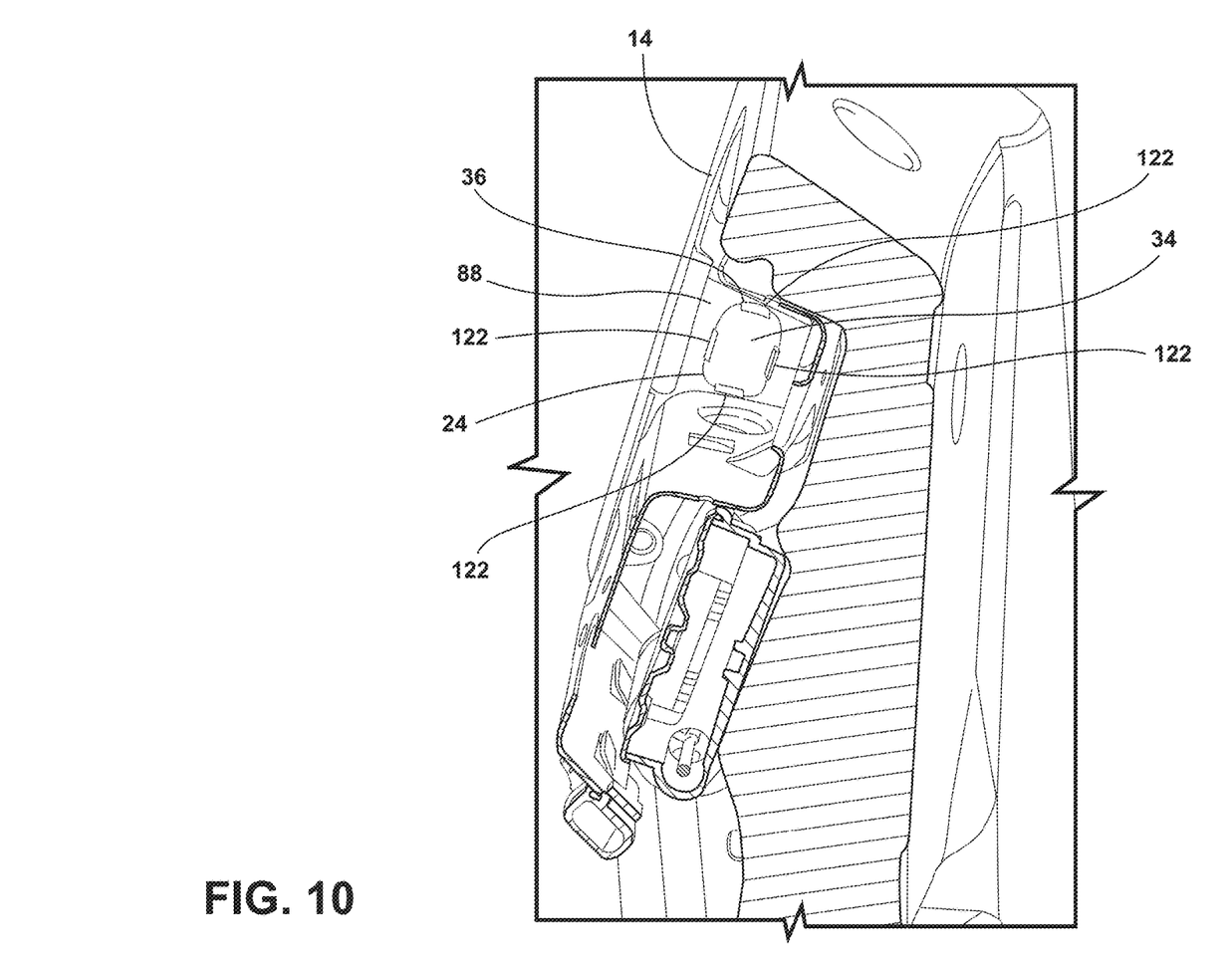
FIG. 10 is a side cross-sectional view of a guide-sleeve of the present disclosure coupled to a seat frame.

Referring now to FIGS. 7-10, the guide-sleeve 34 includes the body 38, the flanges 42, and the retention tabs 36. As mentioned above, the body 38 may be a hollow body, such that the hollow body 38 defines the cavity 40 through which the first end 46 of the cable 44 extends. The cavity 40 spans the length of the body 38, such that the body 38 defines a first opening 110 and a second opening 112 with the cavity 40 being defined therebetween. It is generally contemplated that the body 38 may be integrally formed with the flanges 42, such that the body 38 and the flanges 42 may be formed from a single material. It is also contemplated that the body 38 may be separately formed and coupled to the flanges 42. The flanges 42 generally outwardly extend from the body 38, such that a flange 42 is positioned on each side of the body 38. It is also contemplated that the flanges 42 may be a single flange 42 upon which the body 38 is positioned and coupled. As illustrated in FIG. 8, the flanges 42 extend from the body 38, such that each flange 42 defines an outer surface 114. In addition, the flanges 42 form a unitary planar surface that may be referred to as an attachment surface 116, as illustrated in FIG. 9.

The guide-sleeve 34 includes the retention tabs 36 that outwardly extend from the attachment surface 116. Each of the retention tabs 36 include a planar surface 118 and a protruding surface 120. The guide-sleeve 34 is disposed within the attachment aperture 24 of the seat frame 14, such that the retention tabs 36 generally engage the upper portion 20 of the seat frame 14 when the guide-sleeve 34 is disposed within the attachment aperture 24. Stated differently, the retention tabs 36 of the guide-sleeve 34 are operably coupled to the engagement edges 88 of the seat frame 14. The protruding surface 120 of the retention tabs 36 each generally define a projection 122 that is configured to engage the engagement edges 88 around the attachment aperture 24. The protruding surface 120 may have a hook-like configuration, such that the projections 122 may hook or latch onto the engagement edges 88 of the seat frame 14.

The retention tabs 36 of the guide-sleeve 34 generally define a snap-fit arrangement between the guide-sleeve 34 and the seat frame 14. Stated differently, the projections 122 of the guide-sleeve 34 snap-fit into the attachment aperture 24 and engage the engagement edges 88 to couple the guide-sleeve 34 to the seat frame 14. In addition, the flanges 42 may generally provide structural stability for the guide-sleeve 34, such that the guide-sleeve 34 may engage the seat frame 14 as the cable 44 transitions within the cavity 40, described further below. This engagement of the flanges 42 with the seat frame 14 may be complimented by the engagement of the projections 122 with the seat frame 14.

With further reference to FIGS. 7-11, the retention tabs 36 of the guide-sleeve 34 may orthogonally extend from the attachment surface 116 of the guide-sleeve 34. It is also contemplated that the retention tabs 36 may be generally curved or have an otherwise arcuate shape, such that the retention tabs 36 may be form-fitted within the attachment aperture 24 of the seat frame 14. This construction of the retention tabs 36 and the attachment aperture 24 of the seat frame 14 minimizes potential shifting or alteration of the guide-sleeve 34 relative to the seat frame 14. For example, the retention tabs 36 maintain the position of the guide-sleeve 34 relative to the seat frame 14 as the cable 44 is translated through the body 38 of the guide-sleeve 34.

Figure 11:
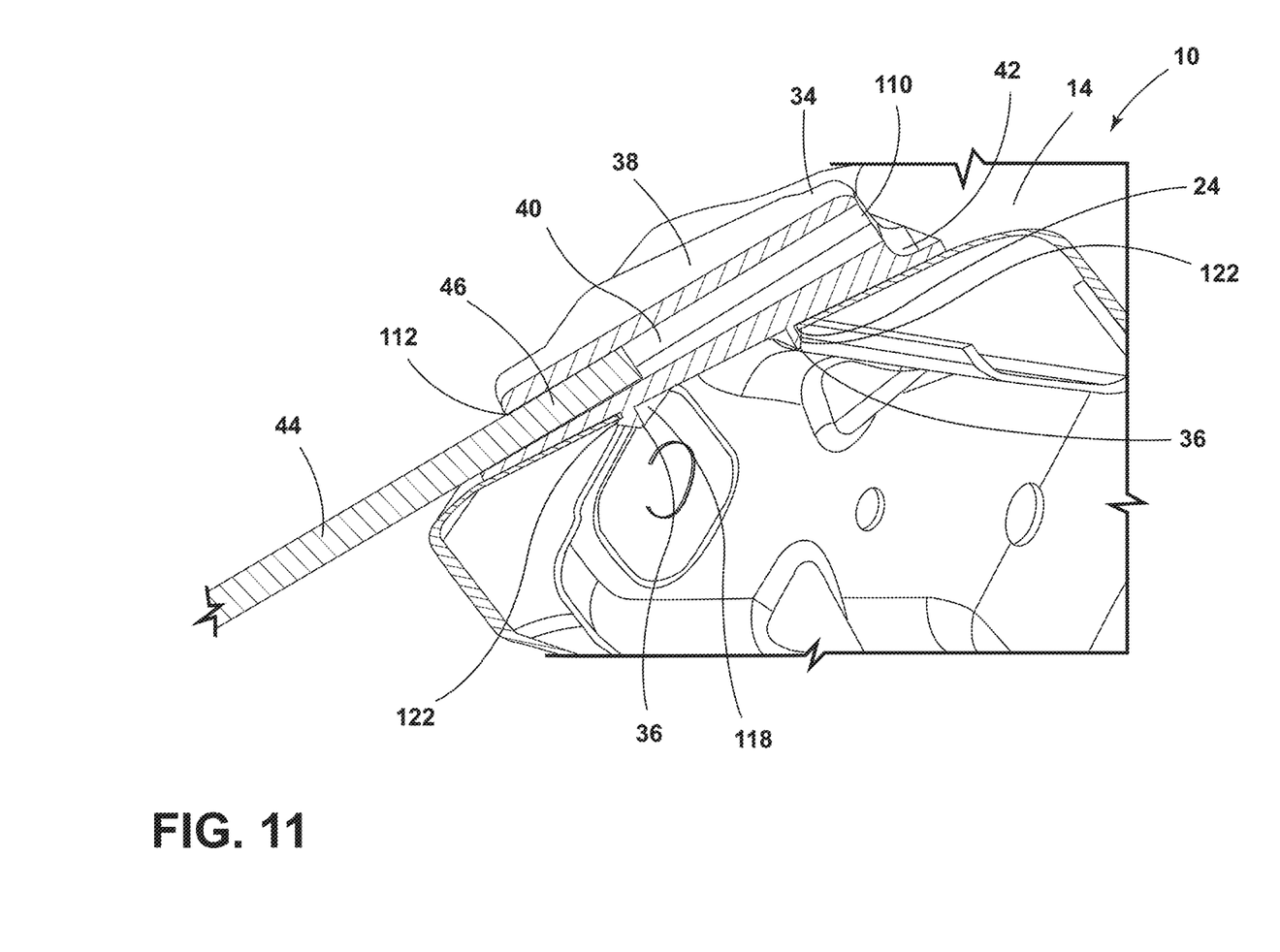
FIG. 11 is a cross-sectional view of a guide-sleeve of the present disclosure with a first end of a cable disposed within a cavity of the guide-sleeve.
Figure 12:
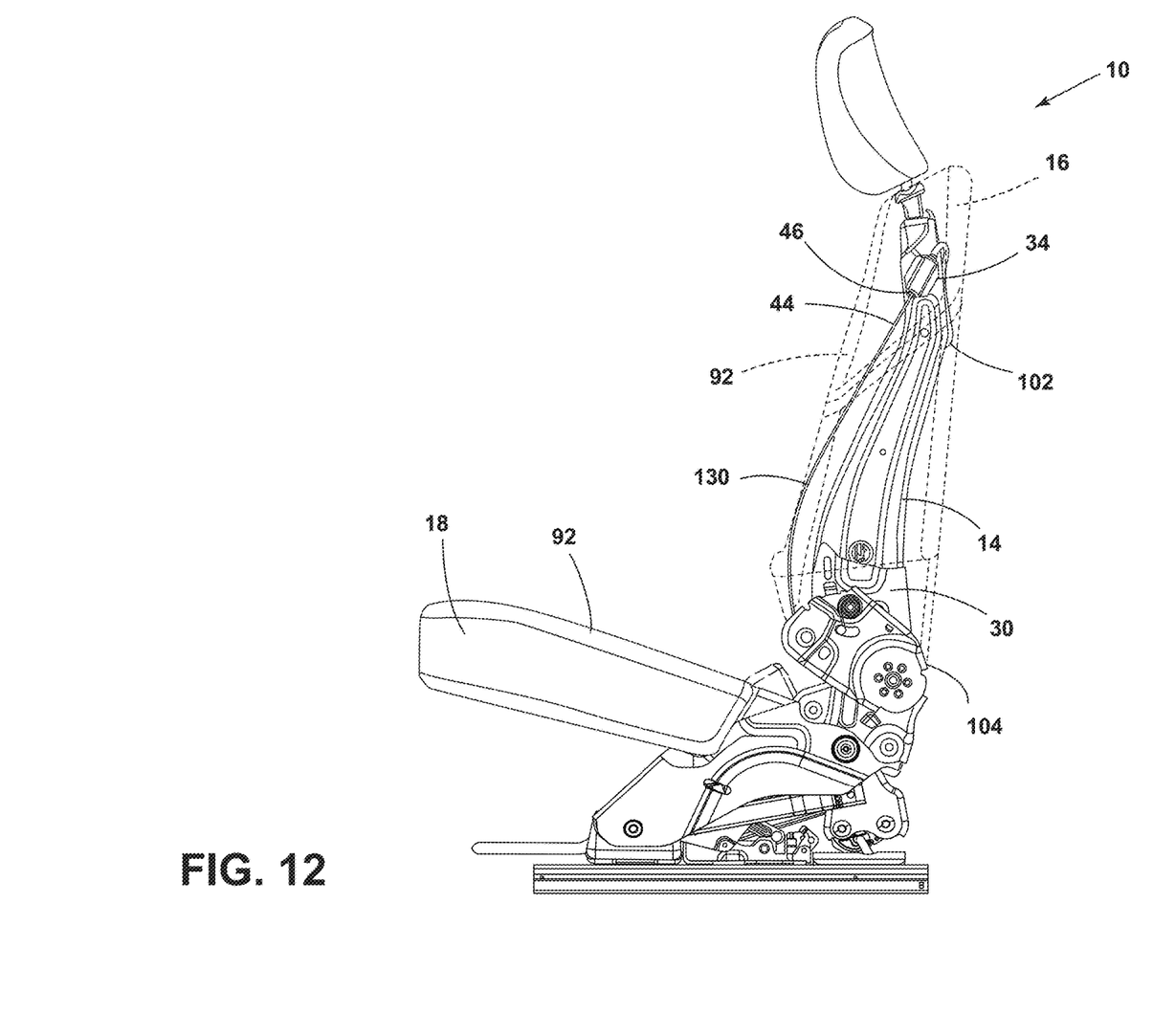
FIG. 12 is a side elevational view of a seating assembly of the present disclosure in a support position.
Figure 13:
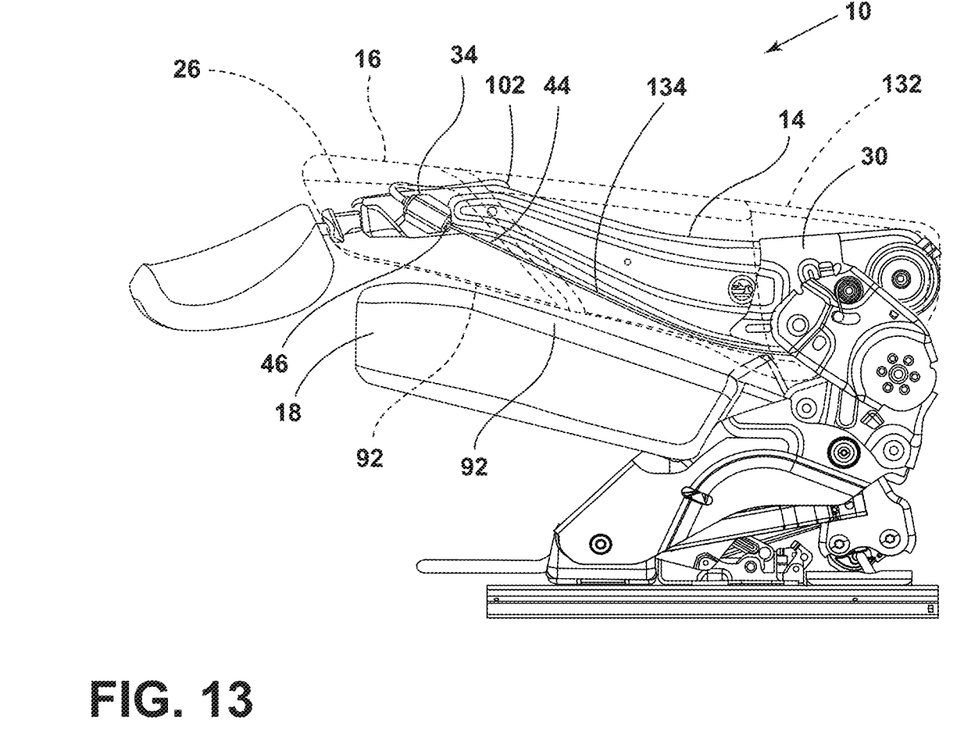
FIG. 13 is a side elevational view of a seating assembly in a storage position.

Referring now to FIGS. 11-13, the seating assembly 10 may be positioned in either a support position 130 (FIG. 12) and a storage position 132 (FIG. 13), such that an occupant may sit on the seat base 18 in the support position 130. The support position 130 is so defined as the bolsters 92 of the seating assembly 10 are configured to support the occupant in the support position 130. The pliable body 26 may also be operable between the first, support position 130 and the second, storage position 132. The seatback 16 may be transitioned into the storage position 132 of the seating assembly 10, such that the bolsters 92 and the cable 44 may be described as being in a compressed position 134. When the seatback 16 is in the support position 130, the cable 44 and bolsters 92 are also in the support position 130 as the cable 44 and the bolsters 92 are providing support for an occupant.

Thus, the cable 44 is selectively operable between the support position 130 and the compressed position 134. It is also contemplated that the support position 130 may be referred to as the first position and the compressed position 134 may be referred to as the second position. The first end 46 of the cable 44 translates within the cavity 40 of the guide-sleeve 34 as the cable 44 is translated into the compressed position 134. As mentioned above, the second end 48 of the cable 44 is coupled to the bracket 30, which provides a fixed attachment point of the cable 44. This fixed attachment point may provide resistance as the cable 44 is compressed, such that the cable 44 may be taut and/or tense in the compressed position 134.

With further reference to FIGS. 11-13, it is generally contemplated that the cable 44 and bolsters 92 may be translated between the support position 130 and the compressed position 134 via the power actuator 102. The power actuator 102 may be coupled to the seat frame 14 and operably coupled to the first end 46 of each of the cables 44. The power actuator 102 is selectively operable to translate the first end 46 of the cable 44 through the cavity 40 of the guide-sleeve 34, such that the power actuator 102 may be configured to translate the cable 44 between the support position 130 and the compressed position 134. This transition by the power actuator 102 retracts the first end 46 of the cable 44, such that the cable 44 is in the compressed position 134.

The seatback 16 may translate forward as the cable 44 is retracted, such that the seatback 16 engages the seat base 18 of the seating assembly 10 in the compressed position 134 of the cable 44 to enter the storage position 132 of the seating assembly 10. The bolster 92 compresses away from the seat base 18 when the seatback 16 is in contact with the seat base 18, such that the bolster 92 is in the compressed position 134. As generally mentioned above, the cable 44 is disposed within the channel 28 (FIG. 5) defined by the pliable body 26, such that the pliable body 26 typically follows the compression of the cable 44. The cable 44 is configured to translate the pliable body 26 between the first, support position 130 and the second, compressed position 134. Stated differently, the cable 44 remains within the channel 28 (FIG. 5) defined by the pliable body 26 as the cable 44 and the bolster 92 translate from the support position 130 into the compressed position 134. While the cable 44 may be compressed via the power actuator 102, it is also contemplated that the cable 44 and the bolster 92 may be manually compressed.

Manual compression of the bolsters 92 may be achieved by folding the seatback 16 down toward the seat base 18 and compressing the seatback 16 against the seat base 18. The compression of the seatback 16 against the seat base 18 compresses the bolsters 92 and, in turn, compresses the pliable body 26 and the cable 44. The weight of the seatback 16 is typically sufficient to minimize the potential that the bolsters 92 and the cable 44 may rebound or otherwise extend. Thus, the bolsters 92 and the cables 44 remain in the compressed position 134 until the seatback 16 is lifted from the seat base 18 and returns to the support position 130. It is generally contemplated that the cable 44 and the corresponding bolster 92 may deflect approximately 35 millimeters. Additionally or alternatively, the bolsters 92 may deflect greater than 35 millimeters and/or less than 35 millimeters.

Referring again to FIGS. 1-13, the cable 44 transitions within the guide-sleeve 34, such that the cable 44 is compressed toward the seat frame 14. The compression of the cable 44 minimizes the overall protrusion of the bolsters 92 of the seatback 16 to generally define the compressed position 134 of the seating assembly 10. The compressed position 134 generally provides a planar storage space for a user of the vehicle, such that the seatback 16 may be generally parallel with the seat base 18. Moreover, the guide-sleeve 34 is snap-fitted with the seat frame 14 to securely couple the guide-sleeve 34 to the seatback 16 during the transition of the cable 44 from the support position 130 to the compressed position 134. The snap-fit arrangement of the guide-sleeve 34 and the seat frame 14 minimizes overall assembly time and stabilizes the overall connectivity between the cable 44 and the seat frame 14.

According to one example, a seating assembly for a vehicle includes a seat frame including a seatback and a seat base. The seat frame has an upper portion that defines an attachment aperture and a lower portion. A pliable body is disposed over and is coupled to the seatback. The pliable body defines a channel along a length of the pliable body. A bracket is coupled to the lower portion of the seatback. A guide-sleeve is coupled to the upper portion of the seat frame. The guide-sleeve has retention tabs, a body that defines a cavity, and flanges that extend outwardly from the body. A cable has a first end that is selectively disposed within the cavity of the guide-sleeve and a second end is coupled to the bracket. Embodiments of the present disclosure may include one or a combination of the following features.

- An attachment aperture of a seat frame is defined by engagement edges, wherein retention tabs of a guide-sleeve are operably coupled to the engagement edges of the seat frame.
- A cable is disposed within a channel of a pliable body and is configured to translate the pliable body between a first position and a second position.
- A cable is selectively operable between a support position and a compressed position.
- A seatback engages a seat base in a compressed position of a cable.
- A power actuator is coupled to a seat frame and is operably coupled to a cable, wherein the power actuator is configured to translate the cable between a support position and a compressed position.
- Retention tabs of a guide-sleeve have a planar surface and a protruding surface that defines a projection, wherein the projection of each retention tab engages an upper portion of a seat frame.

According to another example, a vehicle seating assembly includes a frame that has an upper portion and a lower portion. A pliable body is disposed over the frame and defines a channel along a length of the pliable body. A cable is disposed within the channel of the pliable body and is selectively operable between a first position and a second position. A guide-sleeve is coupled to the frame and includes a hollow body that defines a cavity. The guide-sleeve also includes retention tabs that extend from the hollow body and are configured to couple the guide-sleeve to the frame. The cable is operably disposed within the cavity of the hollow body. Embodiments of the present disclosure may include one or a combination of the following features.

- A second position of a cable is a compressed position, wherein a channel retains the cable in the compressed position.
- An upper portion of a frame has engagement edges that define an attachment aperture, wherein a guide-sleeve is at least partially disposed within the attachment aperture to define a snap-fit arrangement.
- Retention tabs include projections that are operably coupled to engagement edges of a frame.
- A frame is operable between a support position and a storage position, wherein a cable is in a first position in the support position of the frame.
- A power actuator is operably coupled to a cable and is configured to translate the cable between a first position and a second position.

According to yet another example, a seating assembly includes a frame that has an upper portion that defines an attachment aperture and a lower portion. A bracket is coupled to the lower portion. A cable has a first end and a second end that is coupled to the bracket. The cable is operable between a support position and a compressed position. A guide-sleeve is operably coupled with the cable and is disposed within the attachment aperture of the upper portion of the frame. The guide-sleeve includes retention tabs that are operably coupled to the upper portion. Embodiments of the present disclosure may include one or a combination of the following features.

- A pliable body is coupled to a frame and defines a channel, wherein a cable is disposed within the channel.

A pliable body is operable between a first position and a second position, wherein the first position of the pliable body corresponds to a support position of a cable.

Retention tabs have a planar surface and a protruding surface, wherein the protruding surface engages an upper portion of a frame that is proximate an attachment aperture.

A guide-sleeve further includes a hollow body that defines a cavity and a flange that extends outwardly from the hollow body, wherein a cable translates within the cavity between a support position and a compressed position.

A power actuator is operably coupled to a cable and is configured to translate the cable relative to a guide-sleeve.

Retention tabs include a projection, wherein the projection is operably coupled to an upper portion of a frame to define a snap-fit arrangement between a guide-sleeve and a frame.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seating assembly for a vehicle, comprising:
   a seat frame including a seatback and a seat base, the seat frame having an upper portion that defines an attachment aperture and a lower portion;
   a pliable body disposed over and coupled to the seatback, the pliable body defining a channel along a length of the pliable body;
   a bracket coupled to the lower portion of the seatback;
   a guide-sleeve coupled to the upper portion of the seat frame, the guide-sleeve having retention tabs, a body defining a cavity, and flanges extending outwardly from the body; and
   a cable having a first end selectively disposed within the cavity of the guide-sleeve and a second end coupled to the bracket.

2. The seating assembly of claim 1, wherein the attachment aperture of the seat frame is defined by engagement edges, and wherein the retention tabs of the guide-sleeve are operably coupled to the engagement edges of the seat frame.

3. The seating assembly of claim 1, wherein the cable is disposed within the channel of the pliable body and configured to translate the pliable body between a first position and a second position.

4. The seating assembly of claim 1, wherein the cable is selectively operable between a support position and a compressed position.

5. The seating assembly of claim 4, wherein the seatback engages the seat base in the compressed position of the cable.

6. The seating assembly of claim 4, further comprising:
   a power actuator coupled to the seat frame and operably coupled to the cable, wherein the power actuator is configured to translate the cable between the support position and the compressed position.

7. The seating assembly of claim 1, wherein the retention tabs of the guide-sleeve have a planar surface and a protruding surface that defines a projection, and wherein the projection of each retention tab engages the upper portion of the seat frame.

8. A vehicle seating assembly, comprising:
   a frame having an upper portion and a lower portion;
   a pliable body disposed over the frame and defining a channel along a length of the pliable body;
   a cable disposed within the channel of the pliable body and selectively operable between a first position and a second position; and
   a guide-sleeve coupled to the frame and including a hollow body that defines a cavity and retention tabs extending from the hollow body and configured to couple the guide-sleeve to the frame, the cable being operably disposed within the cavity of the hollow body.

9. The vehicle seating assembly of claim 8, wherein the second position of the cable is a compressed position, and wherein the channel retains the cable in the compressed position.

10. The vehicle seating assembly of claim 8, wherein the upper portion of the frame has engagement edges that define an attachment aperture, and wherein the guide-sleeve is at least partially disposed within the attachment aperture to define a snap-fit arrangement.

11. The vehicle seating assembly of claim 10, wherein the retention tabs include projections that are operably coupled to the engagement edges of the frame.

12. The vehicle seating assembly of claim 8, wherein the frame is operable between a support position and a storage position, and wherein the cable is in the first position in the support position of the frame.

13. The vehicle seating assembly of claim 8, further comprising:
 a power actuator operably coupled to the cable and configured to translate the cable between the first position and the second position.

14. A seating assembly, comprising:
 a frame having an upper portion defining an attachment aperture and a lower portion;
 a bracket coupled to the lower portion;
 a cable having a first end and a second end coupled to the bracket, the cable being operable between a support position and a compressed position; and
 a guide-sleeve operably coupled with the cable and disposed within the attachment aperture of the upper portion of the frame, the guide-sleeve including retention tabs operably coupled to the upper portion.

15. The seating assembly of claim 14, further comprising:
 a pliable body coupled to the frame and defining a channel, wherein the cable is disposed within the channel.

16. The seating assembly of claim 15, wherein the pliable body is operable between a first position and a second position, and wherein the first position of the pliable body corresponds to the support position of the cable.

17. The seating assembly of claim 14, wherein the retention tabs have a planar surface and a protruding surface, and wherein the protruding surface engages the upper portion of the frame proximate the attachment aperture.

18. The seating assembly of claim 14, wherein the guide-sleeve further includes a hollow body defining a cavity and a flange extending outwardly from the hollow body, and wherein the cable translates within the cavity between the support position and the compressed position.

19. The seating assembly of claim 14, further comprising:
 a power actuator operably coupled to the cable and configured to translate the cable relative to the guide-sleeve.

20. The seating assembly of claim 14, wherein the retention tabs include a projection, and wherein the projection is operably coupled to the upper portion of the frame to define a snap-fit arrangement between the guide-sleeve and the frame.

* * * * *